(12) United States Patent
Mitsudera et al.

(10) Patent No.: US 7,361,704 B2
(45) Date of Patent: Apr. 22, 2008

(54) VINYL CHLORIDE RESIN COMPOSITION FOR VEHICLES

(75) Inventors: Taro Mitsudera, Saitama (JP); Kiyotatsu Iwanami, Saitama (JP); Ken Nishihara, Saitama (JP)

(73) Assignee: Adeka Corporation, Tokyo (JP)

( * ) Notice: Subject to any disclaimer, the term of this patent is extended or adjusted under 35 U.S.C. 154(b) by 316 days.

(21) Appl. No.: 10/539,405

(22) PCT Filed: Sep. 9, 2004

(86) PCT No.: PCT/JP2004/013115

§ 371 (c)(1),
(2), (4) Date: Jun. 17, 2005

(87) PCT Pub. No.: WO2005/033197

PCT Pub. Date: Apr. 14, 2005

(65) Prior Publication Data

US 2006/0052517 A1    Mar. 9, 2006

(30) Foreign Application Priority Data

Sep. 30, 2003 (JP) ............................. 2003-341675

(51) Int. Cl.
*C08K 5/09* (2006.01)

(52) U.S. Cl. ................... 524/298; 524/297; 524/296

(58) Field of Classification Search ............. 524/296, 524/297, 298
See application file for complete search history.

(56) References Cited

U.S. PATENT DOCUMENTS

| 3,686,361 A | 8/1972 | De Witt, III et al. |
| 4,247,440 A | 1/1981 | Asai et al. |
| 4,892,683 A | 1/1990 | Naseem |
| 2004/0122149 A1* | 6/2004 | Kadakia et al. .............. 524/406 |

FOREIGN PATENT DOCUMENTS

| JP | 52-28544 | 3/1977 |
| JP | 58-37039 | 3/1983 |
| JP | 2-138355 | 5/1990 |
| JP | 2-209941 | 8/1990 |
| JP | 5-279485 | 10/1993 |
| JP | 6-287385 | 10/1994 |
| JP | 10-306187 | 11/1998 |

* cited by examiner

*Primary Examiner*—Peter D. Mulcahy
(74) *Attorney, Agent, or Firm*—Young & Thompson

(57) ABSTRACT

A vinyl chloride based resin composition for a vehicle, which comprises 100 parts by mass of a vinyl chloride based resin, and 5 to 200 parts by mass of a plasticizer component consisting of (a) at least one trimellitate based plasticizer and (b) at least one sebacate based plasticizer in a mass ratio [(a) component/(b) component] of 99/1 to 60/40. The resin composition is excellent in thermal stability, the resistance to thermal aging, the resistance to a low temperature and the resistance to fogging, and further is excellent in the formability such as gelling property, the easiness in the release from a mold, and the property of staining a mold, and thus is suitable for use in powder molding.

8 Claims, No Drawings

VINYL CHLORIDE RESIN COMPOSITION FOR VEHICLES

TECHNICAL FIELD

This invention relates to a vinyl chloride resin composition for vehicles, more particularly, a vinyl chloride resin composition with improved heat stability, thermal aging resistance, cold resistance, fog resistance, and the like and suited for use as an automotive interior trim material.

BACKGROUND ART

Vinyl chloride resins are excellent in physical properties such as mechanical strength, chemical resistance, and weatherability and yet relatively inexpensive. Semirigid or non-rigid vinyl chloride resins have been widely used as covering materials for automotive interior trim.

Nevertheless, the recent tendency to thickness reduction for cost reduction and requirement for higher performance have boosted the demand for improvements on not only processing stability but also thermal aging characteristics and light resistance during use, and the like.

In order to impart softness to interior trim materials, covering materials of vinyl chloride resins are sometimes lined with urethane. Lining with urethane adversely affects the vinyl chloride resins, especially in terms of resin stability. Improvement for addressing this problem has been awaited.

In recent years, covering materials for crash pads, armrests, headrests, consoles, meter covers, door trim, etc., as automotive interior trim materials, have been expected to have an expensive look with a grain leather pattern, a stitch pattern, etc. as well as lightness in weight and a soft feel.

Conventionally employed covering materials for these applications include vacuum formings of flexible sheets made mainly of a vinyl chloride resin and an ABS resin and rotational castings or slush castings of sol mainly comprising a vinyl chloride resin for paste and a plasticizer (hereinafter referred to as sol castings). The vacuum formings achieve lightness in weight but have a boardy feel lacking softness. It is difficult to produce vacuum formings with an intricate shape such as an expensive-looking grain leather pattern or stitch pattern. In addition, vacuum forming induces a large residual strain so that the vacuum formings easily develop cracks in long-term use.

On the other hand, the sol castings have a soft feel. However, a sol melts fast in a mold because of its low gelling temperature and causes unfavorable phenomena such as flow marks, lipping, and stringing of the sol. Therefore, sol casting has disadvantages, such as poor product surface smoothness, too much time required to drain sol from the mold, and an increased thickness of the covering materials. Furthermore, sol casting involves labor-intensive operation of cleaning a tank, pipes, etc. in case of color changeover. Sol to be cast does not withstand long-term storage due to viscosity change with time.

Powder molding is recently in the spotlight as means addressing the above-described disadvantages and problems. Powder molding techniques typically include fluidization dip coating, electrostatic coating, powder spray coating, and powder rotational or slush molding. Powder rotational molding or powder slush molding is particularly suited to produce covering materials for automotive interior trim.

Powder rotational molding or powder slush molding is a technique in which powder is melted and stuck or sprayed to the inner wall of a rotating or pivoting mold set at a temperature of 180° C. or higher. The mold is integral with a powder feed box, and unmelted powder is automatically or forcibly recovered in the powder feed box.

Systems for heating the mold used in such powder molding include a gas heating oven system, a heating medium oil circulation system, a system of dipping in a heating medium oil or a thermally fluidized sand, and a radiofrequency induction heating system.

A powder composition used in powder molding is required to quickly gel in a mold, to have good releasability from a mold, and not to contaminate a mold as well as to have high heat stability in view of the advantage of powder molding that molding completes at high temperature in short time.

Automotive interior trim materials can be exposed to relatively high temperatures. The temperature of an automotive interior trim is expected to rise near 100° C. in a midsummer sun-heated car. This being the case, automotive interior trim made of vinyl chloride resins will undergo deteriorations (thermal aging), such as coloration.

Where a vinyl chloride resin composition is applied to automotive interior trim, there arises, in addition to the thermal aging problem, a phenomenon that the additives in the composition such as a plasticizer and a stabilizer evaporate into vapors, which adhere to car windows to cause fog. Fog of car windows seriously threatens the safety. Hence, the materials used to make automotive interior trim are also required to have improved fog resistance.

In applications in cold regions like Hokkaido (in winter) or North Europe, automotive interior trim, being exposed in low temperature, becomes hard and brittle and easily breaks on impact. For example, if a material having poor cold resistance is used as a cover of an airbag, the breaking can cause an injury. Materials of automotive interior trim are therefore required to have improved cold resistance.

Automotive interior trim covering materials contain by choice a trimellitic ester plasticizer to improve heat resistance; for a trimellitic ester plasticizer hardly vaporizes when heated in high temperature and hardly migrates into a lining urethane foam layer. However, trimellitic ester plasticizers have a disadvantage of poor cold resistance.

To solve the above problem, the patent document 1 and the patent document 2 propose using a trimellitic ester plasticizer obtained from a specific alcohol component, and the patent document 3 and the patent document 4 propose using a combination of a specific vinyl chloride resin and a trimellitic ester plasticizer. These proposals are still unsatisfactory, however.

Patent document 1: JP-A-2-138355
Patent document 2: JP-A-2-209941
Patent document 3: JP-A-5-279485
Patent document 4: JP-A-10-306187

DISCLOSURE OF THE INVENTION

The problem to be settled lies in that there has been no vinyl chloride resin composition that is excellent in characteristics required of materials used as automotive interior trim, i.e., heat stability, thermal aging resistance, cold resistance, and fog resistance, and also molding characteristics, such as gelling properties, releasability from mold, and non-contaminating properties, and is therefore fit for powder molding.

Accordingly, an object of the present invention is to provide a vinyl chloride resin composition that is excellent in not only characteristics required of a material used in automotive interior trim including heat stability, thermal aging resistance, cold resistance, and fog resistance but also molding characteristics, such as gelling properties, releasability from mold, and non-contaminating properties, and is therefore fit for powder molding.

As a result of extensive studies, the present inventors have found that the above object is accomplished by a vinyl chloride resin composition containing a combination of a trimellitic ester plasticizer and a sebacic ester plasticizer at a specific ratio as a plasticizer system.

The present invention has been completed based on the above finding. The invention provides a vinyl chloride resin composition for vehicles comprising 100 parts by mass of a vinyl chloride resin and 5 to 200 parts by mass, in total, of (A) at least one trimellitic ester plasticizer and (B) at least one sebacic ester plasticizer. The mass ratio of component (A) to component (B) is 99/1 to 60/40.

BEST MODE FOR CARRYING OUT THE INVENTION

The vinyl chloride resin composition for vehicles according to the present invention will be described in detail.

The vinyl chloride resin that can be used in the invention is not particularly limited by the method of polymerization and includes those obtained by bulk polymerization, solution polymerization, suspension polymerization, emulsion polymerization, etc. Examples of the vinyl chloride resins include polyvinyl chloride, chlorinated polyvinyl chloride, polyvinylidene chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride terpolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate terpolymers, vinyl chloride-maleic ester copolymers, vinyl chloride-methacrylic ester copolymers, vinyl chloride-acrylonitrile copolymers, vinyl chloride-vinyl ether copolymers; blends of the above-recited vinyl chloride resins with themselves; blends, block copolymers or graft copolymers of the above-recited vinyl chloride resins with other chlorine-free synthetic resins, such as acrylonitrile-styrene copolymers, acrylonitrile-butadiene-styrene copolymers, ethylene-vinyl acetate copolymers, ethylene-ethyl (meth)acrylate copolymers, and polyesters.

The trimellitic ester plasticizer that can be used as component (A) in the invention includes a triester compound formed between trimellitic acid and a monohydric alcohol.

Examples of the monohydric alcohol that can be used to prepare the triester compound as component (A) include straight-chain or branched alcohols, such as methanol, ethanol, propyl alcohol, isopropyl alcohol, butyl alcohol, isobutyl alcohol, sec-butyl alcohol, tert-butyl alcohol, pentyl alcohol, isopentyl alcohol, hexanol, isohexanol, heptanol, octanol, 2-ethylhexanol, nonyl alcohol, isononyl alcohol, decanol, isodecanol, undecanol, dodecanol, tridecanol, isotridecanol, tetradecanol, pentadecanol, hexadecanol, heptadecanol, octadecanol, nonadecanol, eicosanol, heneicosanol, and docosanol; and mixtures thereof.

Of these monohydric alcohols preferred are those having 7 to 10 carbon atoms, such as heptanol, octanol, 2-ethylhexanol, nonyl alcohol, isononyl alcohol, and decanol, and mixtures thereof. When in using a triester compound between trimellitic acid and the preferred monohydric alcohol component as component (A), molded products with excellent fog resistance and cold resistance can be obtained.

The sebacic ester plasticizer that can be used as component (B) in the invention includes a diester compound formed between sebacic acid and a monohydric alcohol.

The monohydric alcohol that can be used to prepare the diester compound as component (B) includes the straight-chain or branched alcohols and their mixtures recited above for use in the preparation of component (A).

Of the recited monohydric alcohols preferred are those having 8 to 10 carbon atoms, such as heptanol, octanol, 2-ethylhexanol, nonyl alcohol, isononyl alcohol, and decanol, and mixtures thereof. When in using a diester compound between sebacic acid and the preferred monohydric alcohol component as component (B), molded products with excellent fog resistance and cold resistance can be obtained.

The trimellitic ester plasticizer (A) and the sebacic ester plasticizer (B) are used in an (A) to (B) mass ratio of 99/1 to 60/40, preferably 97/3 to 65/35, still preferably 95/5 to 70/30. If the proportion of component (A) exceeds the above range, the resulting molded product has poor cold resistance. If the proportion of component (B) exceeds the range, the product has reduced fog resistance.

The total amount of components (A) and (B) is 5 to 200 parts by mass, preferably 10 to 100 parts by mass, per 100 parts by mass of the vinyl chloride resin. If the total amount is less than 5 parts by mass, there is produced an insubstantial effect on improving cold resistance. If it exceeds 200 parts by mass, the product will have reduced fog resistance and can cause plate-out, bleeding, and so on.

Seeing that the concept of the invention resides in providing a vinyl chloride resin composition for vehicles exhibiting excellence in heat resistance, thermal aging resistance, cold resistance, fog resistance, etc. owing to a combined use of components (A) and (B) as a plasticizer system, the vinyl chloride resin composition for vehicles of the invention may contain small amounts of other plasticizers commonly added to vinyl chloride resins in addition of components (A) and (B) according to necessity. The amount of other plasticizers than components (A) and (B) should be 20% by mass or less based on the total plasticizer content.

Useful other plasticizers include phthalate plasticizers, e.g., dibutyl phthalate, butylhexyl phthalate, diheptyl phthalate, dioctyl phthalate, diisononyl phthalate, diisodecyl phthalate, dilauryl phthalate, dicyclohexyl phthalate, and dioctyl terephthalate; adipate plasticizers, e.g., dioctyl adipate, diisononyl adipate, diisodecyl adipate, and di(butyl diglycol) adipate; phosphate plasticizers, e.g., triphenyl phosphate, tricresyl phosphate, trixylenyl phosphate, tri(isopropylphenyl) phosphate, triethyl phosphate, tributyl phosphate, trioctyl phosphate, tri(butoxyethyl) phosphate, and octyldiphenyl phosphate; polyester plasticizers obtained by using polyhydric alcohols, e.g., ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, and neopentyl glycol, and dibasic acids, e.g., oxalic acid, malonic acid, succinic acid, glutaric acid, adipic acid, pimelic acid, suberic acid, azelaic acid, sebacic acid, phthalic acid, isophthalic acid, and terephthalic acid, and, if desired, a monohydric alcohol or a monocarboxylic acid as a stopper; tetrahydrophthalic acid plasticizers, azelaic acid plasticizers, stearic acid plasticizers, citric acid plasticizers, biphenyltetracarboxylic acid ester plasticizers, and chlorine-containing plasticizers.

Other additives commonly used in vinyl chloride resin compositions can optionally be added to the vinyl chloride resin composition for vehicles of the present invention. The additives include metal salts of organic carboxylic acids, phenols or organic phosphoric acids, zeolite compounds, hydrotalcite compounds, epoxy compounds, β-diketone compounds, polyhydric alcohols, phosphorus type, phenol type or sulfur type antioxidants, ultraviolet absorbers, light stabilizers, such as hindered amines, perchloric acid salts, and other inorganic metal compounds.

The metal constituting the metal salts of organic carboxylic acids, phenols or organic phosphoric acids includes lithium, potassium, sodium, calcium, barium, magnesium, strontium, zinc, tin, cesium, aluminum, and organotins.

Examples of the organic carboxylic acids include monocarboxylic acids such as acetic acid, propionic acid, butyric acid, valeric acid, caproic acid, enanthic acid, caprylic acid, pelargonic acid, 2-ethylhexylic acid, neodecanoic acid, capric acid, undecanoic acid, lauric acid, tridecanoic acid, myristic acid, palmitic acid, isostearic acid, stearic acid, 12-hydroxystearic acid, behenic acid, montanic acid, benzoic acid, monochlorobenzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, cuminic acid, n-propylbenzoic acid, aminobenzoic acid, N,N-dimethylaminobenzoic acid, acetoxybenzoic acid, salicylic acid, p-tert-octylsalicylic acid, elaidic acid, oleic acid, linoleic acid, linolenic acid, thioglycolic acid, mercaptopropionic acid, and octylmercaptopropionic acid; dicarboxylic acids, such as oxalic acid, malonic acid, succinic acid, glutaric acid, adipic acid, pimelic acid, suberic acid, azelaic acid, sebacic acid, phthalic acid, isophthalic acid, terephthalic acid, hydroxyphthalic acid, chlorophthalic acid, aminophthalic acid, maleic acid, fumaric acid, citraconic acid, mesaconic acid, itaconic acid, aconitic acid, and thiodipropionic acid, and monoester or monoamide compounds thereof; and di- or triester compounds of tri- or tetracarboxylic acids, such as butanetricarboxylic acid, butanetetracarboxylic acid, hemimellitic acid, trimellitic acid, mellophanic acid, and pyromellitic acid.

Examples of the phenols include tert-butylphenol, nonylphenol, dinonylphenol, cyclohexylphenol, phenylphenol, octylphenol, phenol, cresol, xylenol, n-butylphenol, isoamylphenol, ethylphenol, isopropylphenol, isooctylphenol, 2-ethylhexylphenol, tert-nonylphenol, decylphenol, tert-octylphenol, isohexylphenol, octadecylphenol, diisobutylphenol, methylpropylphenol, diamylphenol, methylisohexylphenol, and methyl-tert-octylphenol.

Examples of he organic phosphoric acids include mono- or dioctylphosphoric acid, mono- or didodecylphosphoric acid, mono- or dioctadecylphosphoric acid, mono- or di(nonylphenyl)phosphoric acid, phosphonic acid nonylphenyl ester, and phosphonic acid stearyl ester.

The metal salts of the organic carboxylic acids, phenols or organic phosphoric acids may be acidic salts, neutral salts, basic salts, or over-based complexes obtained by neutralizing a part or the whole of the base of the basic salts.

The amount of the metal salt of the organic carboxylic acid, phenol or organic phosphoric acid to be added is preferably 0.01 to 10 parts by mass, still preferably 0.05 to 5 parts by mass, per 100 parts by mass of the vinyl chloride resin.

The zeolite compounds are alkali or alkaline earth metal aluminosilicates having a unique three-dimensional zeolite crystal structure. Typical examples of the zeolite compounds are zeolite A, zeolite X, zeolite Y, zeolite P, mordenite, analcite, sodalite, clinoptilolite, erionite, and chabazite. These zeolite compounds may be either a hydrate having water of crystallization (so-called zeolite water) or an anhydride obtained by removing water of crystallization. Those having a particle size of 0.1 to 50 μm, preferably 0.5 to 10 μm, can be used.

As represented by general formula (I) shown below, the hydrotalcite compounds are complex salt compounds composed of magnesium and/or an alkali metal and aluminum or composed of zinc, magnesium, and aluminum. The compounds may be freed of water of crystallization.

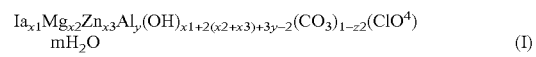

$$Ia_{x1}Mg_{x2}Zn_{x3}Al_y(OH)_{x1+2(x2+x3)+3y-2}(CO_3)_{1-z2}(ClO^4) \cdot mH_2O \qquad (I)$$

wherein Ia represents an alkali metal atom; x1, x2, x3, y, and z each represent a number satisfying the following condition, provided that x1 and x2 do not simultaneously represent zero; m represents a real number; $0 \leq x1 \leq 10$, $0 \leq x2 \leq 10$, $0 \leq x3 \leq 10$, $0 \leq y \leq 10$, and $0 \leq z \leq 10$.

The hydrotalcite compounds may be naturally occurring substances or synthetic products. Method of synthesizing the hydrotalcite compounds include those known from literature, such as JP-B-46-2280, JP-B-50-30039, JP-B-51-29129, JP-B-3-36839, JP-A-61-174270, JP-A-5-179052, JP-A-2001-164042, and JP-A-2002-293535. The above-recited hydrotalcite compounds can be used without any restriction of crystal structure, crystal grain size, and the like.

The hydrotalcite compounds may be coated with a higher fatty acid, such as stearic acid, a higher fatty acid metal salt, such as an alkali metal oleate, an organic sulfonic acid metal salt, such as an alkali metal dodecylbenzenesulfonate, a higher fatty acid amide, a higher fatty acid ester, a wax, etc.

Examples of the epoxy compounds include bisphenol epoxy resins, novolak epoxy resins, epoxidized soybean oil, epoxidized linseed oil, epoxidized tung oil, epoxidized fish oil, epoxidized beef tallow oil, epoxidized castor oil, epoxidized safflower oil, epoxidized tall oil fatty acid octyl ester, epoxidized linseed oil fatty acid butyl ester, methyl epoxystearate, butyl epoxystearate, 2-ethylhexyl epoxystearate, stearyl epoxystearate, tris(epoxypropyl) isocyanurate, 3-(2-xenoxy)-1,2-epoxypropane, epoxidized polybutadiene, bisphenol A diglycidyl ether, vinylcyclohexene diepoxide, dicyclopentadiene diepoxide, 3,4-epoxycyclohexyl 6-methylepoxycyclohexanecarboxylate, and bis(3,4-epoxycyclohexyl) adipate.

Examples of the β-diketone compounds are dehydroacetic acid, dibenzoylmethane, palmitoylbenzoylmethane, and stearoylbenzoylmethane. Metal salts of these compounds are useful as well.

Examples of the polyhydric alcohols include pentaerythritol, dipentaerythritol, sorbitol, mannitol, trimethylolpropane, ditrimethylolpropane, partial stearic acid ester of pentaerythritol or dipentaerythritol, bis(dipentaerythritol) adipate, glycerol, diglycerol, and tris(2-hydroxyethyl) isocyanurate.

Examples of the phosphorus type antioxidants include diphenyldecyl phosphite, triphenyl phosphite, tris(nonylphenyl) phosphite, tridecyl phosphite, tris(2-ethylhexyl) phosphite, tributyl phosphite, dilauryl acid phosphite, dibutyl acid phosphite, tris(dinonylphenyl) phosphite, trilauryl trithiophosphite, trilauryl phosphite, bis(neopentyl glycol)-1,4-cyclohexanedimethyl phosphite, distearylpentaerythritol diphosphite, bis(2,4-di-tert-butylphenyl)pentaerythritol diphosphite, bis(2,6-di-tert-butyl-4-methylphenyl)pentaerythritol diphosphite, diphenyl acid phosphite, hexakis (tridecyl)-1,1,3-tris(2'-methyl-5'-tert-butyl-4'-hydroxyphenyl)butane triphosphite, tetra($C_{12-15}$ mixed alkyl)-4,4'-isopropylidenediphenyl diphosphite, tris(4-hydroxy-2,5-di-tert-butylphenyl) phosphite, tris(mono-/di-mixed nonylphenyl) phosphite, hydrogenated 4,4'-isopropylidenediphenol polyphosphite, diphenyl bis[4,4'-n-butylidenebis(2-tert-butyl-5-methylphenol)]thiodiethanol diphosphite, bis(octylphenyl) bis[4,4'-n-butylidenebis(2-tert-butyl-5-methylphenol)]-1,6-hexanediol diphosphite, phenyl-4,4'-isopropylidenediphenol pentaerythritol diphosphite, phenyldiisodecyl phosphite, tetratridecyl[4,4'-n-butylidenebis(2-tert-butyl-5-methylphenol)] phosphite, 2,2'-methylenebis(2-tert-butyl-5-methylphenol)octyl phosphite, and tris(2,4-di-tert-butylphenyl) phosphite.

Examples of the phenol type antioxidants include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, thiodiethylene glycol bis[(3,5-di-tert-butyl-4-hydroxyphenyl)propionate], 1,6-hexamethylenebis[(3,5-di-tert-butyl-4-hydroxyphenyl)propionate], 1,6-hexamethylenebis[(3,5-di-tert-butyl-4-hydroxyphenyl)propionamide], 4,4'-thiobis(6-tert-butyl-m-cresol), 2,2'-methylenebis(4-methyl-6-tert-butylphenol), 2,2'-methylenebis(4-ethyl-6-tert-butylphenol), bis[3,3-bis(4-hydroxy-3-tert-butylphenyl) butyric acid] glycol ester, 4,4'-butylidenebis(6-tert-butyl-m-cresol), 2,2'-ethylidenebis(4,6-di-tert-butylphenyl), 2,2'-ethylidenebis(4-sec-butyl-6-tert-butylphenyl), 1,1,3-tris(2-methyl-4-hydroxy-5-tert-butylphenyl)butane, bis[2-tert-butyl-4-methyl-6-(2-hydroxy-3-tert-butyl-5-methylbenzyl) phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl)propionyloxy}ethyl]-2,4,8,10-tetraoxaspiro[5.5]undecane, and triethylene glycol bis[(3-tert-butyl-4-hydroxy-5-methylphenyl)propionate].

Examples of the sulfur type antioxidants include dialkyl thiodipropionates, such as a dilauryl, dimyristyl or distearyl ester of thiodipropionic acid; and polyol β-alkylmercaptopropionic acid esters, such as pentaerythritol tetra(β-dodecylmercaptopropionate).

Examples of the ultraviolet absorbers include 2-hydroxybenzophenones, such as 2,4-dihydroxybenzophenone, 2-hydroxy-4-methoxybenzophenone, 2-hydroxy-4-octyloxybenzophenone, and 5,5'-methylenebis(2-hydroxy-4-methoxybenzophenone); 2-(2'-hydroxyphenyl)benzotriazoles, such as 2-(2'-hydroxy-5'-methylphenyl)benzotriazole, 2-(2'-hydroxy-3',5'-di-tert-butylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, and 2,2'-methylenebis(4-tert-octyl-6-benzotriazolyl)phenol; benzoates, such as phenyl salicylate, resorcinol monobenzoate, 2,4-di-tert-butylphenyl 3',5'-di-tert-butyl-4'-hydroxybenzoate, and hexadecyl 3,5-di-tert-butyl-4-hydroxybenzoate; substituted oxanilides, such as 2-ethyl-2'-ethoxyoxanilide and 2-ethoxy-4'-dodecyloxanilide; and cyanoacrylates, such as ethyl α-cyano-β,β-diphenylacrylate and methyl 2-cyano-3-methyl-3-(p-methoxyphenyl)acrylate.

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, N-(2,2,6,6-tetramethyl-4-piperidyl)dodecylsuccinimide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl) propionate, bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl)-2-butyl-2-(3,5-di-tert-butyl-4-hydroxybenzyl) malonate, N,N'-bis(2,2,6,6-tetramethyl-4-piperidyl)hexamethylenediamine, tetra(2,2,6,6-tetramethyl-4-piperidyl) butanetetracarboxylate, tetra (1,2,2,6,6-pentamethyl-4-piperidyl) butanetetracarboxylate, bis(2,2,6,6-tetramethyl-4-piperidyl)·di(tridecyl) butanetetracarboxylate, bis(1,2,2,6,6-pentamethyl-4-piperidyl)·di(tridecyl) butanetetracarboxylate, 3,9-bis[1,1-dimethyl-2-{tris(2,2,6,6-tetramethyl-4-piperidyloxycarbonyloxy) butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane, 1,5,8,12-tetrakis[4,6-bis{N-(2,2,6,6-tetramethyl-4-piperidyl)butylamino}-1,3,5-triazin-2-yl]-1,5,8,12-tetraazadodecane, 1-(2-hydroxyethyl)-2,2,6,6-tetramethyl-4-piperidinol/dimethyl succinate condensate, 2-tert-octylamino-4,6-dichloro-s-triazine/N,N'-bis(2,2,6,6-tetramethyl-4-piperidyl)hexamethylenediamine condensate, and N,N'-bis(2,2,6,6-tetramethyl-4-piperidyl)hexamethylenediamine/dibromoethane condensate.

The perchloric acid salts include perchloric acid metal salts and ammonium perchlorate. The metal constituting the perchloric acid metal salts include lithium, sodium, potassium, calcium, magnesium, strontium, barium, zinc, cadmium, lead, and aluminum. The perchloric acid metal salts and ammonium perchlorate may be either anhydrous or hydrated and may be used in the form of a solution in an alcohol or ester solvent, such as butyl diglycol or butyl diglycol adipate, either as such or as dehydrated.

Addition of the perchloric acid salt to the vinyl chloride resin composition for vehicles of the invention is preferred; for it ensures the improvement on heat stability (thermal aging properties) in relatively low temperatures that is of importance in applications to vehicles.

The amount of the perchloric acid salt to be added is preferably 0.001 to 5 parts by mass, still preferably 0.01 to 3 parts by mass, per 100 parts by mass of the vinyl chloride resin. Less than 0.001 parts by mass produces insufficient effect of addition. Addition of more than 5 parts by mass can cause disadvantages, such as reduction of heat stability.

Examples of inorganic metal compounds include oxides, hydroxides, halides, inorganic acid salts, such as carbonates, sulfates, nitrates, silicates, and phosphates, and their basic salts, of the metal species enumerated as a member constituting the aforementioned metal salts of organic carboxylic acids, etc.

If desired, the vinyl chloride resin composition for vehicles of the invention can optionally contain impact resistance improvers, crosslinking agents, fillers, blowing agents, antistatics, antifoggants, anti-plateout agents, surface treating agents, lubricants, flame retardants, fluorescent agents, antifungals, antimicrobials, metal deactivators, parting agents, pigments, and processing aids.

The vinyl chloride resin composition for vehicles according to the present invention is preferably used in powder molding. The vinyl chloride resin composition for vehicles of the invention is suited for applications to vehicles, mostly automotive interior trim covering materials, especially semirigid or non-rigid covering materials for crash pads, armrests, headrests, consoles, meter covers, and door trim.

EXAMPLES

The present invention will now be illustrated in greater detail by way of Examples and Comparative Examples, but it should be understood that the invention is not limited thereto.

Example 1 and Comparative Example 1

A vinyl chloride resin composition having the following formulation was dried up in a Geer oven at 130° C. for 2 hours and agitated in an automated mortar for 15 minutes to prepare a compound. A chrome mirror plate was heated in a Geer oven at 300° C. for about 15 minutes. After the mirror plate was taken out of the oven, and when the temperature of the plate dropped to 240° C., the compound was rapidly spread thereon with a uniform thickness and allowed to stand for 10 seconds. The mirror plate (mold) was held upside down and left to stand for an additional 30 second period. The mirror plate was dipped in a water tank to cool. There was obtained a 1.0 mm thick sheet.

The gelled state of the sheet was observed, and the gelling properties were evaluated according to the following rating standards.

Rating Standards:
A: Completely gelled.
B: Gelled with particles remaining inside.
C: Gelled with unevenness on the surface.
D: Partly non-gelled.

The sheet was put in a Geer oven at 250° C. to measure the decomposition time.

The yellowness of the sheet was measured.

To evaluate thermal aging resistance, the sheet was acceleratedly aged in a Geer oven at 120° C. for 300 hours. Coloration of the sheet was observed with the naked eye to rate the resistance to discoloration on a one (the best) to five (worst) scale. The sheet was subjected to tensile test in accordance with JIS K7113 before and after the accelerated aging to obtain an elongation retention (%).

The brittleness temperature of the sheet was measured with a Crash-Berg tester. A brittleness temperature of −38° C. or lower promises sufficient endurance of use in cold regions.

To evaluate fog resistance, the sheet cut to 50 mm by 50 mm was put in a 1 liter flask. The flask, closed with a glass plate, was heated in an oil bath kept at 130° C. for 3 hours. The fog (haze) on the glass plate was measured with a haze meter. A haze of 10 or smaller is acceptable for practical use.

The results obtained are shown in Table 1 below.

| Formulation | Part by mass |
|---|---|
| Suspension-polymerized PVC | 90 |
| Paste PVC | 10 |
| Epoxidized soybean oil | 5 |
| Zinc stearate | 0.2 |
| Sodium zeolite A (NA-Z) | 3.0 |
| Perchloric acid-treated hydrotalcite (C-HT) (empirical formula: $Mg_{4.5}Al_2(OH)_{13}\cdot(CO_3)_{0.2}(ClO_4)_{0.8}\cdot4.5H_2O$) | 1.0 |
| Sodium perchlorate | 0.1 |
| Hexakis(tridecyl)-1,1,4-butylidene tris(6-tert-butyl-m-cresol) triphosphite | 1.0 |
| Test compound (see Table 1) | see Table 1 |

TABLE 1

| Test Compound Kind | Amount | Gelling Properties | Decomposition time (min) | Yellowness | Thermal Aging Resistance Coloration | Elongation Retention | Brittleness Temperature (° C.) | Haze |
|---|---|---|---|---|---|---|---|---|
| Comparative Example: | | | | | | | | |
| 1-1 TM-1 | 60 | A | 14 | 34.8 | 1 | 94 | −35.4 | 3.5 |
| 1-2 TM-1 | 30 | A | 14 | 32.1 | 3 | 82 | −39.8 | 23.1 |
| PH-1 | 30 | | | | | | | |
| 1-3 TM-1 | 55 | A | 14 | 35.6 | 3 | 78 | −39.2 | 19.8 |
| AD-1 | 5 | | | | | | | |
| 1-4 PH-1 | 50 | A | 14 | 32.9 | 3 | 83 | −43.6 | 27.3 |
| SE-1 | 10 | | | | | | | |
| 1-5 TM-1 | 30 | A | 14 | 32.5 | 3 | 80 | −45.9 | 42.3 |
| SE-1 | 30 | | | | | | | |
| Example: | | | | | | | | |
| 1-1 TM-1 | 45 | A | 14 | 35.3 | 2 | 88 | −42.9 | 8.6 |
| SE-1 | 15 | | | | | | | |
| 1-2 TM-1 | 50 | A | 14 | 35.3 | 1 | 90 | −42.0 | 6.4 |
| SE-1 | 10 | | | | | | | |
| 1-3 TM-1 | 55 | A | 14 | 38.6 | 1 | 93 | −39.0 | 6.3 |
| SE-1 | 5 | | | | | | | |
| 1-4 TM-1 | 50 | A | 14 | 36.1 | 1 | 91 | −43.0 | 6.1 |
| SE-2 | 10 | | | | | | | |

TABLE 1-continued

| Test Compound | | Gelling Properties | Decomposition time (min) | Yellowness | Coloration | Thermal Aging Resistance Elongation Retention | Brittleness Temperature (° C.) | Haze |
|---|---|---|---|---|---|---|---|---|
| Kind | Amount | | | | | | | |
| 1-5 TM-1 | 50 | A | 14 | 36.3 | 1 | 92 | −42.7 | 6.5 |
| SE-3 | 10 | | | | | | | |
| 1-6 TM-2 | 50 | A | 14 | 36.9 | 1 | 92 | −44.6 | 6.6 |
| SE-1 | 10 | | | | | | | |

TM-1: Tris($C_{7-9}$ mixed alkyl) trimellitate
TM-2: Tris($C_{8-10}$ mixed alkyl) trimellitate
SE-1: Di(2-ethylhexyl) sebacate
SE-2: Diisononyl sebacate
SE-3: Diisodecyl sebacate
AD-1: Di(2-ethylhexyl) adipate
PH-1: Di(2-ethylhexyl) phthalate Example 2 and Comparative Example 2

A sheet was prepared from the following formulation and evaluated in terms of gelling properties, decomposition time at 250° C., yellowness, brittleness temperature, and haze in the same manner as in Example 1. The results obtained are shown in Table 2 below.

| Formulation | Part by mass |
|---|---|
| Suspension-polymerized PVC | 90 |
| Paste PVC | 10 |
| Epoxidized soybean oil | 5 |
| Titanium dioxide (rutile) | 2 |
| Zinc stearate | 0.2 |
| Sodium zeolite A (NA-Z) | 3.0 |
| Hydrotalcite (HT-1) | 1.0 |
| (empirical formula: $Mg_4Al_2(OH)_{12} \cdot CO_3 \cdot 3H_2O$) | |
| Sodium perchlorate | 0.8 |
| Hexakis(tridecyl)-1,1,4-butylidene tris(6-tert-butyl-m-cresol) triphosphite | 1.0 |
| Test compound (see Table 2) | see Table 2 |

TABLE 2

| Test Compound | | Gelling Properties | Decomp. Time (min) | Yellow-ness | Brittleness Temp. (° C.) | Haze |
|---|---|---|---|---|---|---|
| Kind | Amount | | | | | |
| Comparative Examples: | | | | | | |
| 2-1 TM-1 | 60 | A | 15 | 36.9 | −33.8 | 3.8 |
| 2-2 TM-1 | 30 | A | 15 | 33.4 | −45.2 | 38.6 |
| SE-1 | 30 | | | | | |
| Examples: | | | | | | |
| 2-1 TM-1 | 50 | A | 15 | 36.2 | −41.6 | 5.6 |
| SE-1 | 10 | | | | | |
| 2-2 TM-1 | 55 | A | 15 | 39.1 | −38.7 | 6.2 |
| SE-1 | 5 | | | | | |
| 2-3 TM-1 | 50 | A | 15 | 36.7 | −42.6 | 5.8 |
| SE-2 | 10 | | | | | |
| 2-4 TM-1 | 50 | A | 15 | 37.1 | −41.9 | 5.9 |
| SE-3 | 10 | | | | | |
| 2-5 TM-2 | 50 | A | 15 | 37.3 | −43.2 | 6.4 |
| SE-1 | 10 | | | | | |

Example 3 and Comparative Example 3

A sheet was prepared from the following formulation and evaluated in terms for brittleness temperature and haze in the same manner as in Example 1. Furthermore, foaming urethane was applied on the sheet molded on the chrome mirror plate to a given thickness to obtain a urethane-lined sheet. The lined sheet was put in an oven at 120° C. for 300 hours and 450 hours, and the degree of coloration was measured with a Hunter color difference meter to obtain a color difference ($\Delta E$) from the lined sheet before being put into the oven, which was taken as a measure of discoloration resistance of the sheet when exposed in relatively low temperature.

The results of the evaluation are shown in Table 3 below.

| Formulation | Part by mass |
|---|---|
| Suspension-polymerized PVC | 90 |
| Paste PVC | 10 |
| Epoxidized linseed oil | 5 |
| Bisphenol A diglycidyl ether | 3 |
| Zinc stearate | 0.3 |
| Perchloric acid-treated hydrotalcite (C-HT) | 1.0 |
| 2,2'-Methylenebis(2-tert-butyl-5-methylphenol)octyl phosphite | 0.5 |
| Tetra(1,2,2,6,6-pentamethyl-4-piperidyl) butanetetracarboxylate | 0.2 |
| Ammonium perchlorate | 0.1 |
| Test compound (see Table 3) | see Table 3 |

TABLE 3

| Test Compound | | Brittleness Temp. (° C.) | Haze | Color Difference | |
|---|---|---|---|---|---|
| Kind | Amount | | | 300 Hrs | 450 Hrs |
| Comparative Example: | | | | | |
| 3-1 TM-1 | 60 | −35.2 | 3.8 | 30.8 | 36.3 |
| 3-2 TM-1 | 30 | −45.9 | 31.2 | 28.9 | 42.0 |
| SE-1 | 30 | | | | |
| Example: | | | | | |
| 3-1 TM-1 | 50 | −43.1 | 6.9 | 28.6 | 38.5 |
| SE-1 | 10 | | | | |
| 3-2 TM-1 | 55 | −40.6 | 6.1 | 29.1 | 36.8 |
| SE-1 | 5 | | | | |

TABLE 3-continued

| | Test Compound | | Brittleness | | Color Difference | |
|---|---|---|---|---|---|---|
| | Kind | Amount | Temp. (° C.) | Haze | 300 Hrs | 450 Hrs |
| 3-3 | TM-1 | 50 | −43.2 | 6.7 | 28.7 | 38.6 |
| | SE-2 | 10 | | | | |
| 3-4 | TM-1 | 50 | −42.8 | 6.5 | 28.8 | 37.9 |
| | SE-3 | 10 | | | | |
| 3-5 | TM-2 | 50 | −43.0 | 6.6 | 29.0 | 38.0 |
| | SE-1 | 10 | | | | |

Example 4 and Comparative Example 4

A compound having the following formulation was calendered at 160° C. to obtain 0.7 mm thick rolled sheets, which were laminated on each other on a press at 170° C. for 5 minutes to obtain a 1 mm thick laminated sheet. The rolled sheet was put into a Geer oven at 200° C. to record the time for blackening (browning) to evaluate heat stability. The pressed sheet was evaluated in terms of yellowness, brittleness temperature, and haze in the same manner as in Example 1. The results obtained are shown in Table 4 below.

| Formulation | Part by mass |
|---|---|
| Suspension-polymerized PVC | 90 |
| Paste PVC | 10 |
| Epoxidized linseed oil | 5 |
| Bisphenol A diglycidyl ether | 3 |
| Zinc stearate | 0.3 |
| Hydrotalcite (HT-2) (empirical formula: $Mg_4Al_2(OH)_{12} \cdot CO_3$) | 1.0 |
| Sodium zeolite A | 2.0 |
| Tetra(1,2,2,6,6-pentamethyl-4-piperidyl) butanetetracarboxylate | 0.2 |
| Tetra($C_{12-15}$ mixed alkyl)-4,4'-isopropylidenediphenyl diphosphite | 1.0 |
| Ammonium perchlorate | 0.1 |
| Dibenzoylmethane | 0.1 |
| Test compound (see Table 4) | see Table 4 |

TABLE 4

| | Test Compound | | Heat Stability | | Brittleness | |
|---|---|---|---|---|---|---|
| | Kind | Amount | (min) | Yellowness | Temp. (° C.) | Haze |
| Comparative Example: | | | | | | |
| 4-1 | TM-1 | 65 | 180 | 11.3 | −37.2 | 1.9 |
| 4-2 | TM-1 | 32.5 | 180 | 9.8 | −47.3 | 25.3 |
| | SE-1 | 32.5 | | | | |
| Example: | | | | | | |
| 4-1 | TM-1 | 55 | 180 | 10.9 | −43.1 | 2.6 |
| | SE-1 | 10 | | | | |
| 4-2 | TM-1 | 55 | 180 | 10.2 | −43.2 | 2.8 |
| | SE-2 | 10 | | | | |
| 4-3 | TM-1 | 55 | 180 | 10.9 | −42.8 | 2.7 |
| | SE-3 | 10 | | | | |
| 4-4 | TM-2 | 55 | 180 | 11.0 | −42.9 | 3.1 |
| | SE-1 | 10 | | | | |

The following observations are clearly drawn from Tables 1 through 4. Addition of a trimellitic ester plasticizer alone to a vinyl chloride resin produces excellent fog resistance but results in quite poor cold resistance (see Comparative Examples 1-1, 2-1, 3-1, and 4-1). Combined use of a trimellitic ester plasticizer and a phthalic ester plasticizer at a mass ratio of 50/50 brings about improved cold resistance but results in reduction of fog resistance (see Comparative Example 1-2). Combined use of a trimellitic ester plasticizer and a small proportion of an adipic ester plasticizer (92/8), while improving cold resistance, results in reduced fog resistance (see Comparative Example 1-3). Combined use of a phthalic ester plasticizer and a sebacic ester plasticizer at a mass ratio of 83/17 brings about excellent cold resistance but results in poor fog resistance (see Comparative Example 1-4). Combined use of a trimellitic ester plasticizer and a sebacic ester plasticizer at a mass ratio of 50/50 produces improvement on cold resistance but results in considerable reduction in fog resistance (see Comparative Examples 1-5, 2-2, 3-2, and 4-2).

In contrast, where a combination of a trimellitic ester plasticizer and a sebacic ester plasticizer at a specific mass ratio (75/25, 83/17, 85/15 or 92/8) is added to a vinyl chloride resin, the resulting composition is excellent in cold resistance and fog resistance and satisfactory in gelling properties, heat stability, aging resistance, and the like (see Examples 1 to 4).

INDUSTRIAL APPLICABILITY

The vinyl chloride resin composition for vehicles according to the present invention is excellent in heat stability, thermal aging resistance, cold resistance, and fog resistance and fit for use in vehicle applications as, for example, covering materials for automotive interior trim. The vinyl chloride resin composition for vehicles of the present invention is suited to powder molding owing to its superior molding properties including gelling properties, releasability from mold, and non-contaminating properties.

The invention claimed is:

1. A vinyl chloride resin composition for vehicles comprising 100 parts by mass of a vinyl chloride resin and 5 to 200 parts by mass, in total, of (A) at least one trimellitic ester plasticizer and (B) at least one sebacic ester plasticizer, the mass ratio of component (A) to component (B) being 99/1 to 60/40.

2. The vinyl chloride resin composition for vehicles according to claim 1, wherein the trimellitic ester plasticizer (A) is an ester compound derived from a single or mixed alcohol having 7 to 10 carbon atoms.

3. The vinyl chloride resin composition for vehicles according to claim 1, wherein the sebacic ester plasticizer (B) is an ester compound derived from a single or mixed alcohol having 8 to 10 carbon atoms.

4. The vinyl chloride resin composition for vehicles according to claim 1, further comprising 0.001 to 5 parts by mass of a perchloric acid salt.

5. The vinyl chloride resin composition for vehicles according to claim 1, which is used in powder molding.

6. The vinyl chloride resin composition for vehicles according to claim 2, wherein the sebacic ester plasticizer (B) is an ester compound derived from a single or mixed alcohol having 8 to 10 carbon atoms.

7. The vinyl chloride resin composition for vehicles according to claim 2, further comprising 0.001 to 5 parts by mass of a perchloric acid salt.

8. The vinyl chloride resin composition for vehicles according to claim 3, further comprising 0.001 to 5 parts by mass of a perchloric acid salt.

* * * * *